(12) United States Patent
Postolek

(10) Patent No.: US 10,288,898 B1
(45) Date of Patent: May 14, 2019

(54) EYEGLASS RETAINER AND RELATED METHOD

(71) Applicant: Filip Postolek, Long Beach, CA (US)

(72) Inventor: Filip Postolek, Long Beach, CA (US)

( * ) Notice: Subject to any disclaimer, the term of this patent is extended or adjusted under 35 U.S.C. 154(b) by 0 days.

(21) Appl. No.: 15/654,839

(22) Filed: Jul. 20, 2017

Related U.S. Application Data

(60) Provisional application No. 62/364,449, filed on Jul. 20, 2016.

(51) Int. Cl.
  *G02C 3/00* (2006.01)
  *G02C 5/14* (2006.01)
  *G02C 11/02* (2006.01)

(52) U.S. Cl.
  CPC ............. *G02C 3/003* (2013.01); *G02C 3/006* (2013.01); *G02C 5/143* (2013.01); *G02C 11/02* (2013.01)

(58) Field of Classification Search
  CPC ..................................................... G02C 3/003
  USPC ................... 351/156, 157, 121, 123
  See application file for complete search history.

(56) References Cited

U.S. PATENT DOCUMENTS

| | | | | |
|---|---|---|---|---|
| 5,386,254 A | * | 1/1995 | Kahaney | G02C 3/003 351/116 |
| 5,786,882 A | * | 7/1998 | Satterthwaite | G02C 3/003 351/156 |
| 6,092,897 A | | 7/2000 | Smerdon, Jr. | |
| 8,840,244 B2 | * | 9/2014 | Terry | G02C 3/006 351/121 |

* cited by examiner

*Primary Examiner* — Hung X Dang
(74) *Attorney, Agent, or Firm* — King & Schickli, PLLC

(57) ABSTRACT

Eyeglasses include a temple having upper and lower notches spaced proximally of an opening. A cord including a looped end may be passed through the opening and then over a proximal end of the temple to engage the notches. A related method is also disclosed.

20 Claims, 3 Drawing Sheets

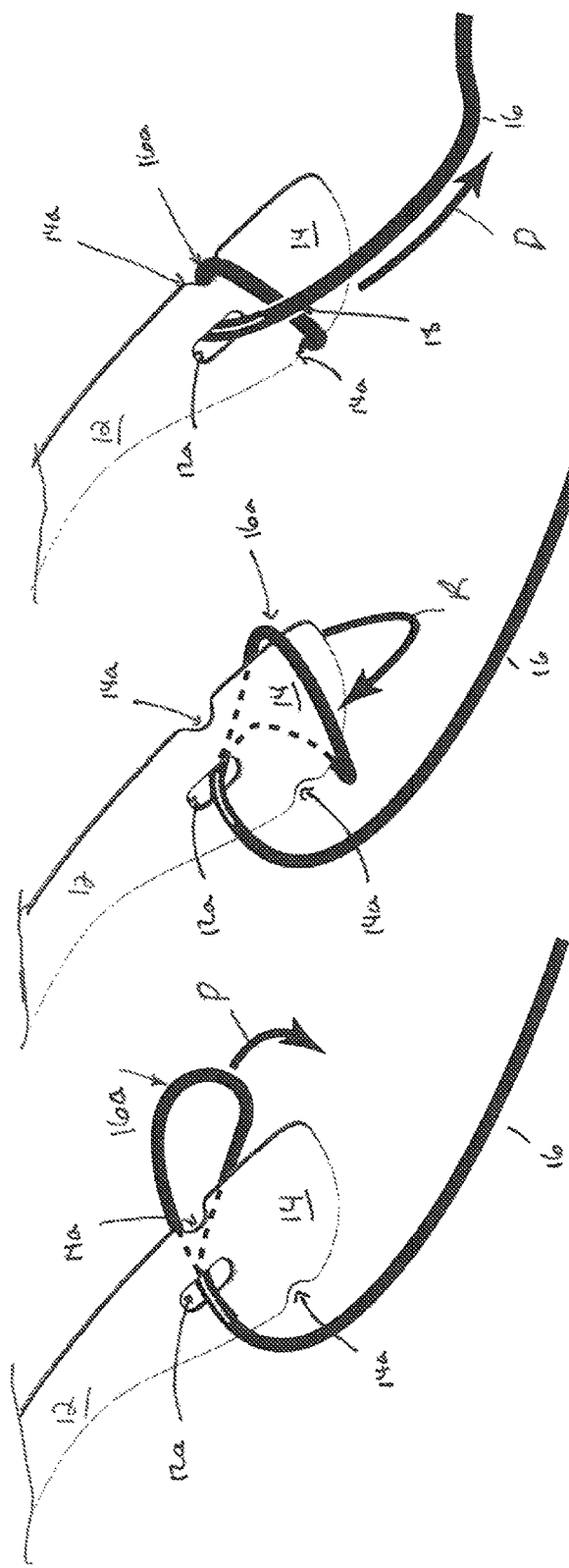

EYEGLASS RETAINER AND RELATED METHOD

This application claims the benefit of U.S. Provisional Patent Application Ser. No. 62/364,449, the disclosure of which is incorporated herein by reference.

TECHNICAL FIELD

This document relates generally to the eyeglass arts and, more particularly, to an eyeglass retainer.

BACKGROUND

A number of retainers have been proposed for securing eyeglasses when in use and also when not in use, such as by hanging around the wearer's neck. Many of these retainers involve cords with oversized receivers for receiving the end of the temple. Fabrication of such receivers typically requires the use of injection molded parts and other pieces that are easily broken or can pull the user's hair, causing discomfort and irritation.

Accordingly, a need is identified for an eyeglass retainer designed to provide comfort and dependability to a user in any number of recreational settings. The retainer could be used with any form of eyeglasses, including sunglasses, and could be used in place of the more complicated and breakable retainers that currently occupy the market.

SUMMARY

According to one aspect of the disclosure, an apparatus comprises eyeglasses including at least one first temple having at least one first opening and at least one first notch. The at least one notch may be proximal of the at least one opening, and a retainer includes at least one loop for passing through the at least one opening (such as a slot). The eyeglasses further include a second temple having a second opening and a second notch, and the retainer (such as a cord) may include a first loop for passing through the first opening to engage the second notch and a second loop for passing through the second opening to engage the second notch. The retainer may be elastic or inelastic, and may include a clip.

The at least one first notch may be formed on a periphery of the at least one first temple. The temple may further include at least one second notch. The at least one first notch may be an upper notch and the at least one second notch is a lower notch.

A further aspect of the disclosure pertains to an apparatus comprising eyeglasses including at least one first opening and at least one first notch, and a retainer including at least one loop extending through the at least one opening and engaging the at least one first notch. The first opening and first notch may be provided on a temple of the eyeglasses (and on both temples in some embodiments). The first notch may be proximal of the first opening, and a portion of the retainer overlies, but does not pass through, the loop when engaged with the at least one notch.

Yet another aspect of the disclosure pertains to a method of securing a retainer to eyeglasses. The method comprises passing a loop of the retainer through an opening in a temple of the eyeglasses. The method further comprises securing the retainer in one or more notches on the temple of the eyeglasses.

In one embodiment, the securing step comprises securing a first portion of the loop in a first notch on the temple of the eyeglasses. The securing step may comprise securing step comprises securing a second portion of the loop in a second notch on the temple of the eyeglasses. The method may further include the step of securing a second loop of the retainer in a second temple of the eyeglasses.

In the following description, there are shown and described several preferred embodiments of the eyeglass retainer. As it should be realized, the arrangement is capable of other, different embodiments and its several details are capable of modification in various, obvious aspects all without departing from eyeglass retainer as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the eyeglass retainer and, together with the description, serve to explain certain principles thereof. In the drawing figures:

FIGS. 4, 5, and 6 are enlarged views illustrating the completion of the connection.

Reference will now be made in detail to the present preferred embodiments of the eyeglass retainer, examples of which are illustrated in the accompanying drawing figures.

DETAILED DESCRIPTION

Figure 1:
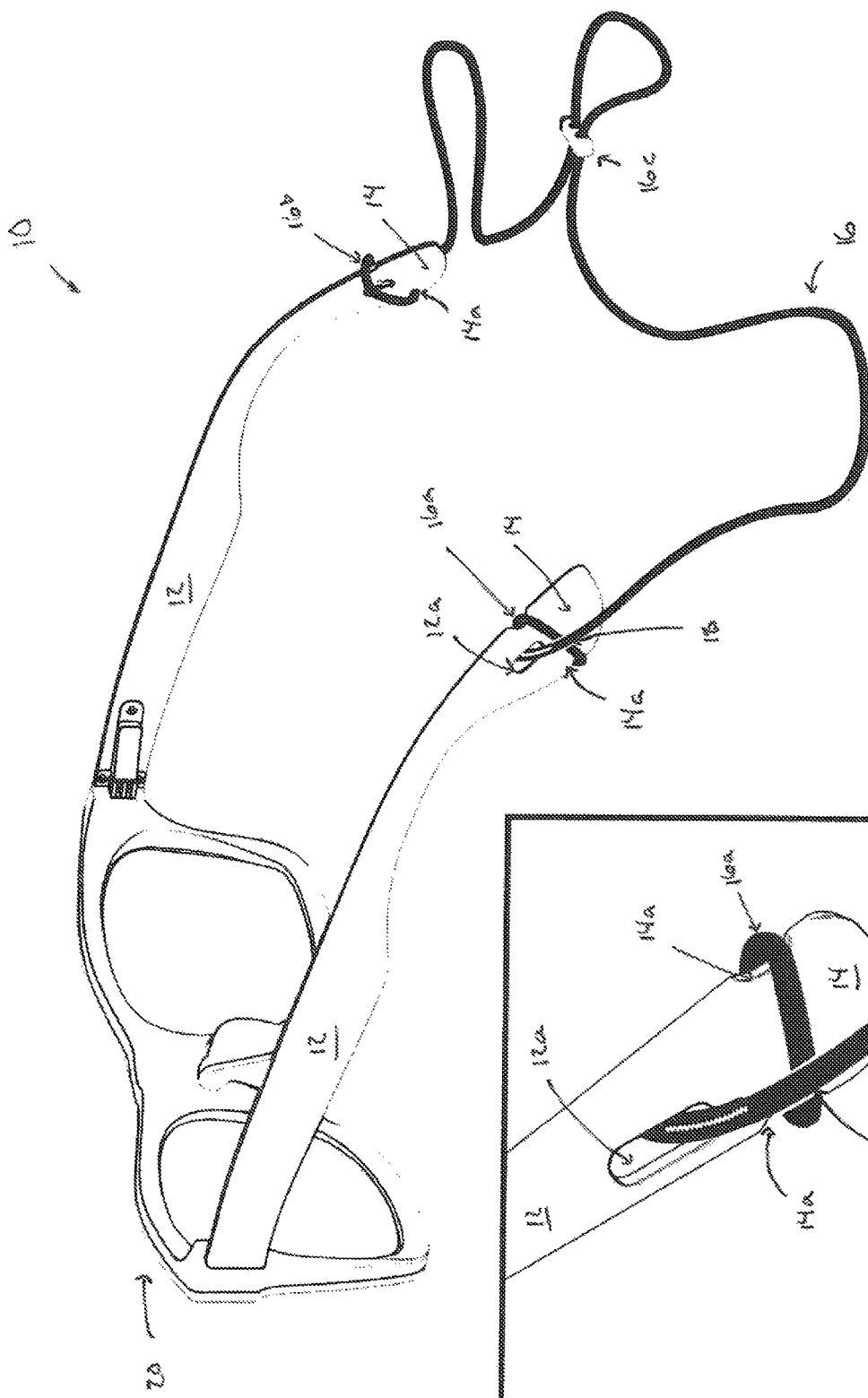
FIG. 1 is a rear perspective view of a pair of eyeglasses with two temples adapted for securing a cord, and thus serving as a retainer.

Reference is now made to FIG. 1, which illustrates a retainer 10 for use in connection with eyeglasses 20, such as sunglasses, reading glasses, or the like. As shown in FIG. 1, the retainer 10 includes a flexible cord 16 having one or more connectors in the form of loops, such as a first loop 16a connected to a first portion of the eyeglasses 20 and a second loop 16b connected to a second end. The first and second portions of the glasses 20 may be the temples 12 of the frames.

The temples 12 may have passages or openings, such as elongated or oversized slots 12a, formed therein (such as on a depending portion or "ear piece" for engaging a wearer's ear) for receiving the closed ends of the respective loops 16a, 16b. Each slot 12a may have a height greater than the diameter of the cord 16, and may be provided substantially at the midpoint of the height of the proximal end of the temple 12. The slots 12a may also have rounded front and rear ends to avoid interfering with the smooth to and fro movement, and may be substantially identical or symmetrical.

To provide a retaining function for the cord 16, notches 14a are also provided in the eyeglasses 20 and, in particular on the proximal ends of the depending portions of the temples 12 (which for purposes of this disclosure are the portions spaced farther away from the ends of the temples that connect with the body of the eyeglasses 20 including the openings adapted for receiving and retaining lenses in most cases, and hence "proximal" means towards the end of the temple 12 for purposes of this disclosure). In the illustrated embodiment, the notches 14a are provided on the upper and lower portions of the temples 12 for positioning near or in engagement with the wearer's ears. In this embodiment, the notches 14a are proximal of the openings 12a (that is, the notches are closer to the tip or earpiece of the temple 12 than the openings 12a). The notches 14a may be scalloped portions formed in peripheral edges of each temple 12.

Figure 2:
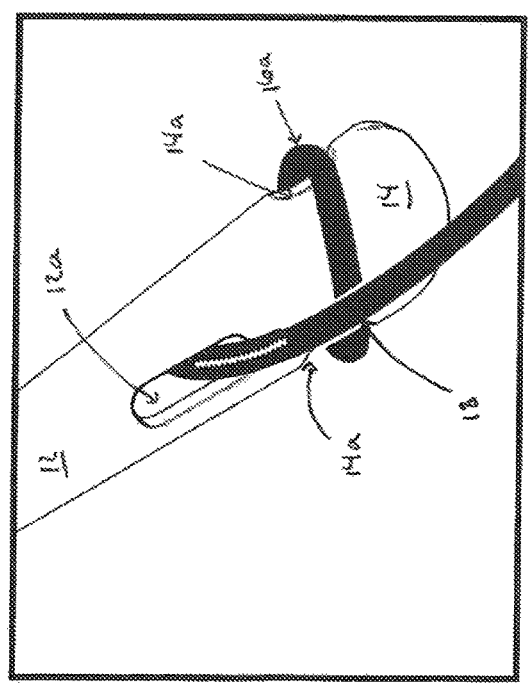
FIG. 2 is a partial close up view of the proximal end of one temple in the FIG. 1 embodiment.
Figure 3:
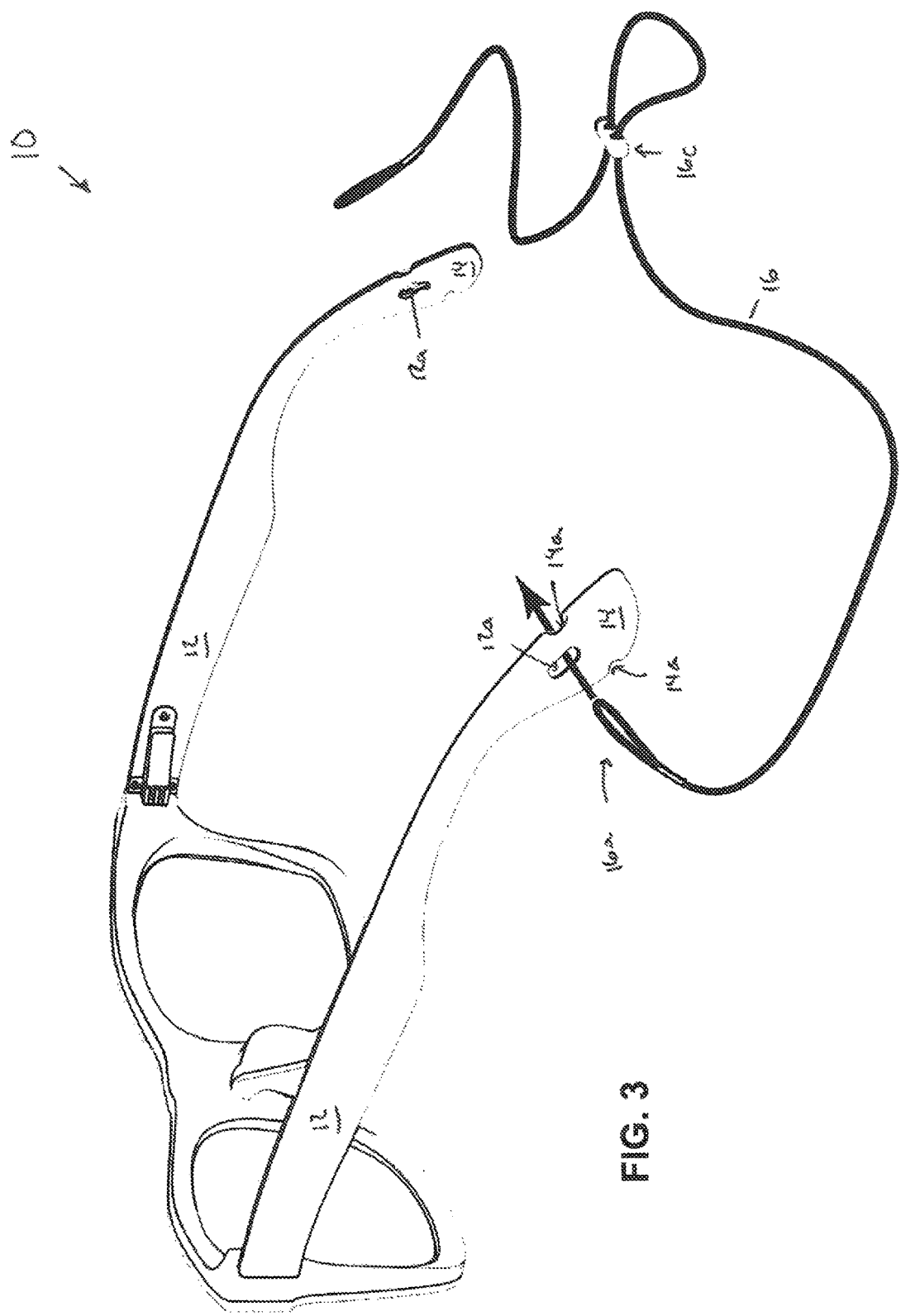
FIG. 3 illustrates the manner in which a loop on one end of the retainer may be secured to the temple.

As best shown in FIG. 2, the loops 16a, 16b of the cord 16 may be used in conjunction with the slots 12a and the notches 14a to secure the two together and thus form the eyeglass retainer 10. Specifically, by passing the loops 16a, 16b through the slots 12a and then securing the loops in the respective notches 14a by passing a portion of the temple 12 through the opening of each loop 16a, 16b, a releasable connection 18 may be created. The arrangement is considered similar to a lark's head type of knot, but without the need to pass the cord through the loop to form the connection (such that the portion overlies the loop, as shown in FIGS. 2 and 6), or otherwise requiring traditional knotting of the cord. The connection 18 is sufficiently strong to bind the cord 16 to the eyeglasses 20, such as for suspending them from the neck of the wearer when not in position for use. Furthermore, once snug, there is little or no potential interference with the wearer's hair.

As indicated in FIG. 1, the cord 16 of the retainer 10 may optionally include a clip 16c which can be used to slide along it and adjust the size to fit the wearer's head, both in the position where the eyeglasses 20 are worn and when suspended by the wearer's neck. The cord 16 may be made of an elastic or inelastic material, or a combination of the two. The loops 16a, 16b may be provided in any suitable manner, such as by using swage clips, knots, or the like.

FIGS. 4, 5 and 6 illustrate the manner in which the retainer 10 may be provided in connection with eyeglasses 20. The end of the loop 16a is passed through the opening 12a from the outside (that is, the opposite side from that adjacent to the user's head when the glasses are worn). The loop 16a is then moved or pulled proximally (arrow P), and rotated or "looped" (arrow R) over the proximal end of the temple 12. The loop 16a may then be advanced along the temple 12 to seat opposing portions of the loop 16 in the opposed notches. The overlying portion of the cord 16 extending outside and over part of the loop 16a may then be pulled away from the proximal end of the temple 12 (arrow D) to form a snug and secure connection.

Removal of the loop 16a from the temple 12 can be done simply by reversing the process. This includes passing the portion of the cord 16 downstream of loop 16a back through the opening 12a (opposite arrow D), until sufficient slack is introduced to lift the portions of the loop 16a secured in notches to a release position. The loop 16a may then be advanced towards the proximal end of the temple 12, rotated toward the inside of the glasses 20 (opposite arrows R and P), and pulled through the opening 12a.

As can be appreciated, the diameter of the cord 16 and the length of the loops 16a, 16b should be arranged to meet two goals. The first is to allow the loops 16a, 16b to pass through the respective openings 12a. The second is to then loop around the proximal end of the temple to a position for being secured in the notches 14a. The particular dimensions of these portions of the cord 16 would depend on the particular dimensions of the eyeglasses 20, and are within the purview of a skilled artisan.

Summarizing, a simple, yet effective eyeglass retainer 10 is provided. The retainer 10 may be used to form a secure connection with the temples 12, and the proximal ends in particular, by passing a loop 16a, 16b through an opening 12a, 12b (slot) therein, and then looping around the proximal end to engage one or more peripheral notches 14a, 14b. A secure connection is thus formed, and the need for molded sleeves or other sophisticated retainers on the cord ends is thus eliminated.

The foregoing description has been presented for purposes of illustration. It is not intended to be exhaustive or to limit the embodiments to the precise form disclosed. Obvious modifications and variations are possible in light of the above teachings. For instance, a single notch may be provided in lieu of two notches in each temple, and may include a gate or tortuous path to secure the cord 16 against unwanted release. All such modifications and variations are within the scope of the appended claims when interpreted in accordance with the breadth to which they are fairly, legally and equitably entitled.

What is claimed:

1. An apparatus comprising:
   eyeglasses including at least one first temple having at least one first opening and at least one first notch;
   wherein the at least one first notch is separate from and proximal of the at least one first opening.

2. The apparatus of claim 1, wherein the eyeglasses further include a second temple having a second opening and a second notch.

3. The apparatus of claim 2, further including a retainer having a first loop for passing through the first opening to engage the first notch and a second loop for passing through the second opening to engage the second notch.

4. The apparatus of claim 1, further including a retainer having at least one loop for passing through the at least one first opening.

5. The apparatus of claim 4, wherein the retainer comprises a cord.

6. The apparatus of claim 5, wherein the cord is elastic or inelastic.

7. The apparatus of claim 5, further including a clip connected to the cord.

8. The apparatus of claim 1, wherein the at least one first opening comprises an enclosed slot.

9. The apparatus of claim 1, wherein the at least one first notch is provided on a periphery of the at least one first temple.

10. The apparatus of claim 1, wherein the at least one first temple further includes at least one second notch.

11. The apparatus of claim 10, wherein the at least one first notch is an upper notch and the at least one second notch is a lower notch.

12. An apparatus, comprising:
    eyeglasses including at least one first opening and at least one first notch; and
    a retainer extending through the at least one opening and including at least one loop engaging the at least one first notch.

13. The apparatus of claim 12, wherein the first opening and first notch are provided on a temple, and the first opening is enclosed and spaced apart from the first notch.

14. The apparatus of claim 13, wherein the first notch is proximal of the first opening.

15. The apparatus of claim 12, wherein a portion of the retainer upstream of the loop overlies, but does not pass through, the loop when engaged with the at least one notch.

16. The apparatus of claim 12, wherein the eyeglasses include a temple having the first notch and a second notch, the at least one loop comprising a first portion secured in the first notch and a second portion secured in the second notch.

17. A method of securing a retainer to eyeglasses, comprising:

passing a loop of the retainer through an opening in a temple of the eyeglasses; and then passing the temple through the loop and engaging the loop in one or more notches provided on the temple of the eyeglasses.

18. The method of claim 17, wherein the securing step comprises securing a first portion of the loop in a first notch on the temple of the eyeglasses.

19. The method of claim 18, wherein the securing step comprises securing a second portion of the loop in a second notch on the temple of the eyeglasses.

20. The method of claim 18, further including the step of securing a second loop of the retainer in a second temple of the eyeglasses.

\* \* \* \* \*